(12) United States Patent
Kolavennu et al.

(10) Patent No.: US 6,904,353 B1
(45) Date of Patent: Jun. 7, 2005

(54) METHOD AND SYSTEM FOR SLIDING MODE CONTROL OF A TURBOCHARGER

(75) Inventors: Soumitri N. Kolavennu, Minneapolis, MN (US); Pierre Barthelet, Remiremont (FR)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/740,340

(22) Filed: Dec. 18, 2003

(51) Int. Cl.$^7$ ............................ F02B 37/24; G06F 17/00
(52) U.S. Cl. ................... 701/102; 701/115; 701/100; 60/602
(58) Field of Search ................ 701/102, 101, 701/115, 100, 99; 60/600, 602, 605.1; 123/568.16

(56) References Cited

U.S. PATENT DOCUMENTS

| | | | |
|---|---|---|---|
| 5,867,986 A | | 2/1999 | Buratti et al. |
| 6,161,384 A | | 12/2000 | Reinbold et al. |
| 6,192,311 B1 | | 2/2001 | Yasui et al. |
| 6,233,934 B1 | * | 5/2001 | Church et al. ............... 60/602 |
| 6,304,812 B1 | | 10/2001 | Kolmanovsky et al. |
| 6,304,815 B1 | | 10/2001 | Moraal et al. |
| 6,466,856 B2 | | 10/2002 | Schmitt |
| 6,490,643 B2 | | 12/2002 | Russell et al. |
| 6,615,584 B2 | * | 9/2003 | Ostertag ..................... 60/602 |
| 6,665,604 B2 | * | 12/2003 | Arnold ....................... 701/100 |
| 2002/0088225 A1 | | 7/2002 | Koch et al. |

OTHER PUBLICATIONS

A. Stefanopoulou et al.; Control of Variable Geometry Turbocharges Diesel Engines For Reduced Emissions; IEEE Transactions on Control Systems Technology; Jul. 2000; vol. 8., 4.
R. Buratti et al., Di Diesel Engine With Variable Geometry Turbocharger (VGT): A Model Based Boost Pressure Control Strategy; Meccanica; May 15, 1097; vol. 32; 409–421.
V. Utkin et al.; Sliding Mode Control For Variable Geometry Turbocharged Diesel Engines; Proceedings of American Control Conference; Jun. 2000; 584–588.

* cited by examiner

*Primary Examiner*—Hieu T. Vo
(74) *Attorney, Agent, or Firm*—Ephraim Starr; Chris James (57) ABSTRACT

A method for defining a sliding mode control system for a turbocharger system is provided. The method includes perturbing a turbocharger actuator and measuring turbocharger boost pressure output from the perturbation. The perturbation and measurements are repeated for a plurality of states of operation of the turbocharger. System parameters identified for each of the plurality of states from the plurality of perturbations and measurements. A sliding mode control law may be defined for each of the plurality of states from the system parameters. A sliding mode control system for controlling the boost pressure of a turbocharger is also provided. An actuator for controlling the boost pressure is electrically controlled by a sliding mode controller to stabilize the turbocharger system toward a setpoint on a sliding surface. The control law is determined from a plurality of linear models from a plurality of operating states of the turbocharger system.

20 Claims, 4 Drawing Sheets

METHOD AND SYSTEM FOR SLIDING MODE CONTROL OF A TURBOCHARGER

FIELD OF THE INVENTION

The present invention relates to turbochargers and turbocharger controllers and methods, and more particularly to turbocharger controllers and methods incorporating sliding mode control for non-linear control applications.

BACKGROUND OF THE INVENTION

A turbocharger improves the efficiency of an internal combustion engine by increasing the pressure and density of the intake air. At the outlet of the engine, an engine's exhaust gases are directed to a turbine wheel translating exhaust energy into rotational mechanical energy of a shaft. The shaft couples the turbine to a compressor disposed in the intake flow of the engine. The compressor increases the pressure and density of the intake flow so that the air-fuel mixture is more combustible. The increase of the mass of air creates more power and torque when the piston is forced downward by the resulting explosion. This process results in a boost to overall engine power.

Turbochargers are required to operate over a wide range of engine speeds and loads. Systems have been developed to precisely control the boost provided by the turbocharger by controlling the exhaust gas provided to the turbine of the turbocharger. The boost pressure is the main control variable. There are several ways to control boost pressure. In one system, a waste gate valve is controlled to bypass a portion of the exhaust thereby controlling the flow rate through the turbine and, thus, the amount of work transferred through the shaft to the compressor. These types of turbochargers are called waste gate turbochargers.

Another control mechanism for controlling the amount of boost provided by a turbocharger includes variable nozzle turbines (VNT) that effectively vary the geometry of the turbine nozzle. These turbochargers are called variable nozzle turbine turbochargers. Such VNT mechanisms include multiple movable aerodynamic blades in the nozzle, or pistons with or without vanes comprising one wall of the nozzle, which are axially movable with respect to a fixed nozzle wall. Control of these mechanisms varies depending on application and can include pneumatic, electromechanical, hydraulic, and electro-hydraulic actuation systems. The control of a turbocharger is complicated by the inherent lag in the engine exhaust system and the transient response times of the mechanical elements of the variable-geometry mechanism.

As stated, the goal of the control system is to maintain the pressure at the inlet of the engine (boost pressure) by manipulating either the waste gate or VNT position. Control of these inputs with respect to boost pressure is non-linear. Additional non-linearities are added by the presence of saturation and backlash in the mechanical actuators and other mechanical parts.

An exhaust gas recirculation valve (EGR) is another variable to the system which is also present in many systems. An EGR connects the exhaust and inlet manifolds and recirculates a portion of the exhaust gas back into the inlet of the engine. The EGR is controlled for purposes of state and federal emission regulations compliance. In this case, the control variable is air flow (mass flow rate) through the engine. Due to the stringent emission regulations, the VNT and EGR have to be controlled at the same time. Therefore, two engine variables must be controlled through VNT and EGR, boost pressure and air flow, respectively.

Air flow and boost pressure closely effect one another. On one hand, a variation of air flow through the turbine due to an EGR change affects the turbine power and thus the boost pressure, therefore requiring quick compensation by the VNT control. On the other hand, a variation in the VNT position affects both boost pressure and engine back pressure, which ultimately changes EGR flow. Therefore any change in VNT position requires compensation by EGR control, and vice versa.

From system identification tests, the response of a turbocharger system may be modeled by a linear transfer function that varies with engine operating conditions, for example, a second order transfer function:

$$\frac{Y(s)}{U(s)} = \frac{K}{s^2 + 2\xi\omega s + \omega^2}$$

Where the input U(s) is the s-domain (Laplace transform) pulse width modulated command signal provided to the VNT actuator or the waste gate actuator; Y(s) is the s-domain boost pressure; K is the static gain; $\omega$ is the natural system pulsation, and $\xi$ is the damping coefficient. The gain, pulsation, and damping also vary as a function of engine state, e.g., engine speed and load.

Previous control strategies included PID (proportional-integral-derivative) controllers with gain schedules based on engine speed and load. However, these approaches require extensive calibration to determine proper PID gains at many different engine states. Other approaches, such as mu-synthesis controllers have also required extensive calibration procedures. Therefore it is desirable to develop a more robust controller, which would allow the usage of a reduced set of universal gains, leading to improved calibration.

SUMMARY OF THE INVENTION

According to the present invention, a method of defining a sliding mode control system and a sliding mode control system for a turbocharger are provided. A turbocharger comprises an actuator for controlling boost pressure of an internal combustion engine. The actuator is typically either a VNT actuator or waste gate actuator that changes the work of exhaust gas transferred to a turbine, which drives a boost pressure compressor. According to embodiments of the present invention, a sliding mode controller controls the actuator.

According to one embodiment, a method for defining a sliding mode control system for a turbocharger system includes perturbing the actuator from a steady state. The resulting boost pressure output is measured from the perturbation. The perturbation and measurements are repeated for a plurality of states of operation of the turbocharger. As a result, system parameters can be identified for each of the plurality of states from the plurality of perturbations and measurements. The system parameters are represented by coefficients of a linear turbocharger system model, and each model represents at least one particular state of the turbocharger system operation. A sliding mode control law is then defined for each of the plurality of states. In this regard, a sliding mode controller stabilizes the turbocharger system toward a sliding surface, s, defined by a line on a phase plane diagram.

One aspect of the method includes perturbing the actuator with a pseudo random binary sequence. Perturbation may take into account the time response of the actuator and, in those embodiments, the perturbation time is at least two times the time constant of the system response. Another embodiment of the sliding mode control need not have a system model and actual dynamics can also be used.

According to another aspect of the invention, the system parameters are identified according to coefficients of linear transfer functions that model the response of the turbocharger at an operating state. The coefficients may include any of pulsation, damping, and gain. These linear transfer function models of the turbocharger may be of at least a second order, however, some turbocharger systems may be modeled at higher orders. The, identification of these system parameters may be determined by an optimization equation. For example, one advantageous optimization equation minimizes the square error between the measured boost pressure and the simulated or modeled boost pressure.

According to another embodiment of the present invention, a sliding mode control system for controlling the boost pressure of a turbocharger is provided. In this embodiment, an actuator for controlling the boost pressure is electrically controlled by a sliding mode controller. The sliding mode controller satisfies a control law that stabilizes the turbocharger system toward a setpoint on a sliding surface, s, defined by a line on a phase plane diagram of boost pressure state. The control law is determined from a plurality of linear models from a plurality of operating states of the turbocharger system, such as described in the method above. However, other methods may be used to define a sliding mode controller from a plurality of linear models, without departing from the spirit or scope of the present invention.

According to one aspect of the present invention, a sliding mode controller defines the sliding surface, s, on the phase plane diagram that is controlled by maintaining ds/dt=0. The sliding mode controller may further satisfy the control law by defining $ds^2/dt? - \eta|s|$, wherein $\eta$ is a positive constant, such that the system always moves toward the sliding surface.

Observers may be employed in some embodiments of the present invention to estimate a derivative of the boost pressure state. The observer provides the estimated derivative so that the sliding mode controller can accurately define the operating states of the turbocharger system. One embodiment of an observer comprises a state estimator based on a model of the turbocharger system. Another embodiment of an observer comprises a state estimator based on a series of integrators.

BRIEF DESCRIPTION OF THE SEVERAL VIEWS OF THE DRAWINGS

Having thus described the invention in general terms, reference will now be made to the accompanying drawings, which are not necessarily drawn to scale, and wherein:

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
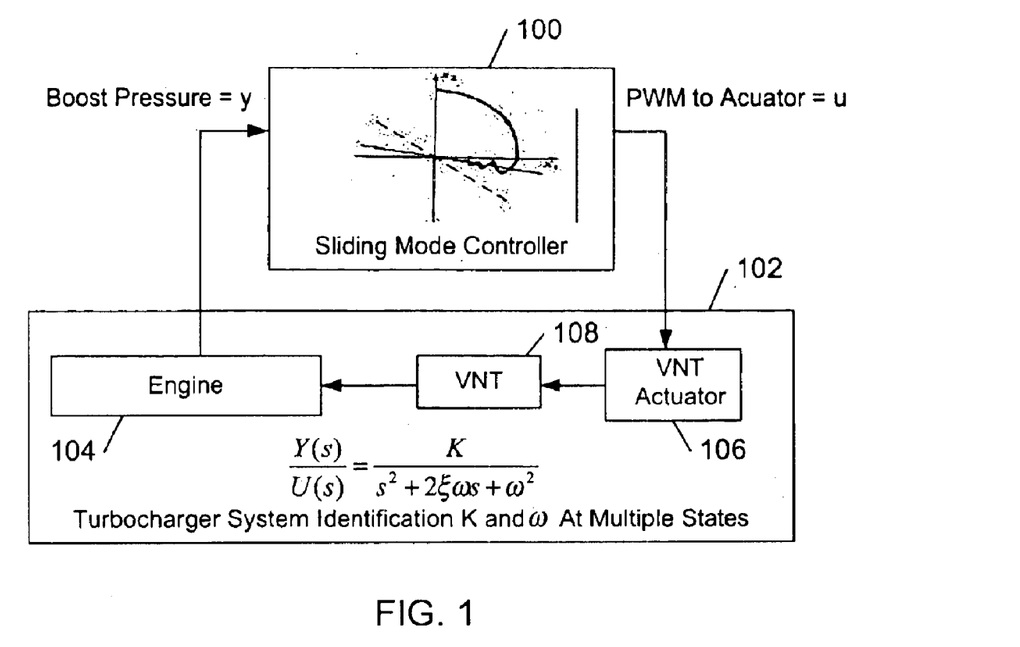
FIG. 1 is a sliding mode control system and VNT turbocharger system according to one embodiment of the present invention.

FIG. 1 illustrates a sliding mode control system including a sliding mode controller 100 and turbocharged internal combustion engine system 102 according to one embodiment of this invention. The engine system comprises an internal combustion engine 104, a VNT actuator 106, and a VNT 108 in air and exhaust flow communication with the engine. The VNT 108 is a variable-geometry member in the form of a number of aerodynamic vanes that are movably attached to an inlet nozzle of the VNT turbine. An example VNT of this type is disclosed in U.S. Pat. No. 6,269,642, which is incorporated herein by reference. The position of the vanes in the VNT 108 is controlled by the actuator 106, which can be configured to pivot the vanes in unison to control incrementally the throat area of the inlet nozzle, and thereby control the amount of exhaust gas that flows into the VNT 108.

The actuator 106 can be an electrical actuator with position feedback configured to communicate with engine controls 104 as part of a controller area network (CAN), which is a communication standard frequently used for in-vehicle control, and known to those of ordinary skill in the art. The actuator is electrically controlled by a pulse width modulated output (PWM) of the sliding mode controller.

The sliding mode controller according to the present invention controls the turbocharger system by way of multiple systems models (in one embodiment second order transfer functions). The models are first identified by system identification tests to model the operating points or states of the system. Even though the systems are non-linear, approximations can be derived for the various operating points individually. All of the operating points or states, therefore, represent multiple models about which the sliding mode controller may be designed. In one embodiment, the multiple models may be second order models. For each of these multiple models, the variable parameters, such as described above, e.g. gains, pulsation and damping, can be determined by approximating the non-linear system with multiple higher order models. In this manner, a robust sliding mode controller may be designed and validated. While a second order transfer function may approximate most VNT turbocharger systems, other turbochargers may require higher order modeling without departing from the spirit or scope of the present invention.

Figure 2:
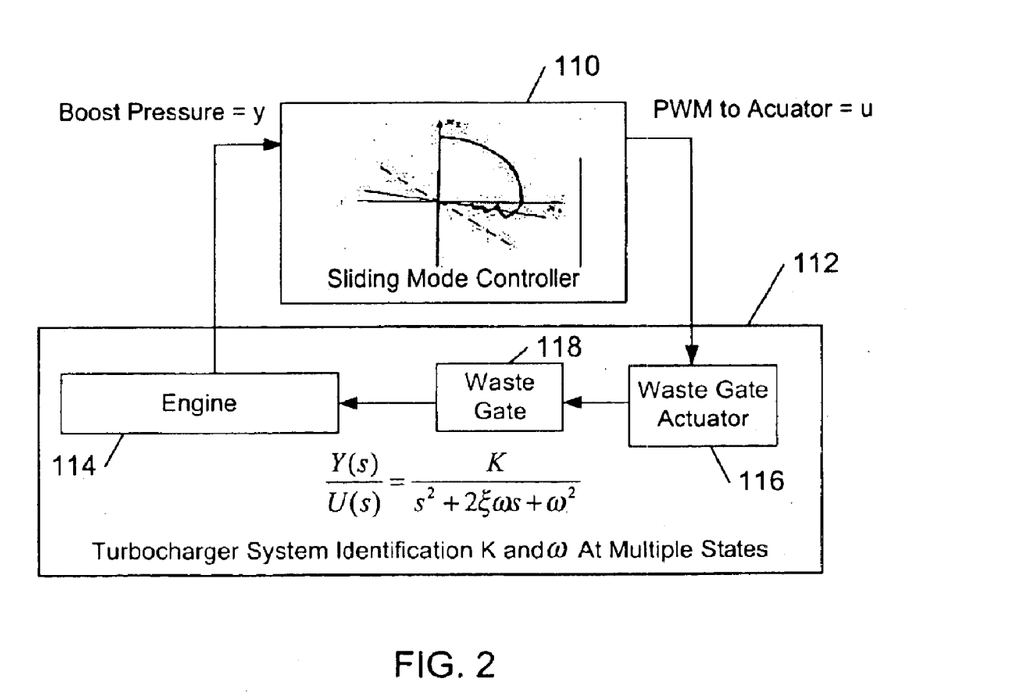
FIG. 2 is a sliding mode control system and waste gate turbocharger system according to one embodiment of the present invention.

A VNT type turbocharger system is illustrated in FIG. 1, but it should be noted that the second order transfer approximation is also applicable to waste gate type turbocharger systems as in FIG. 2. In these systems, the waste gate 118 is controlled by an electromechanical actuator 116 operated by a sliding mode controller 110. Of course, the physical and electrical characteristics and saturation of the waste gate and VNT are quite different, as these characteristics also vary from VNT to VNT and waste gate to waste gate. In this regard, the method and system of sliding mode control are the same for each, as the variables of each second order transfer function, for both VNT and waste gate, are determined in the same manner as described herein. These determined variables distinguish the characteristics of each system as a result of implementing the method and system for sliding mode control of the present invention, thereby making the system and method applicable to all types of turbochargers.

System Identification

Figure 3A:
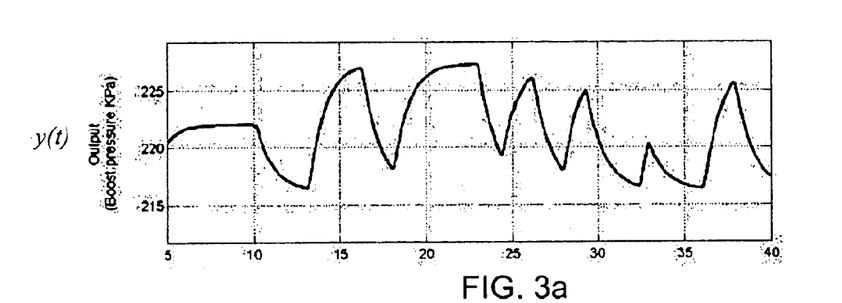
FIGS. 3(a)–(b) are graphs illustrating the input, actuator control, and output, boost pressure, with respect to time according to a method of developing a sliding mode controller according to one embodiment of the present invention.
Figure 3B:
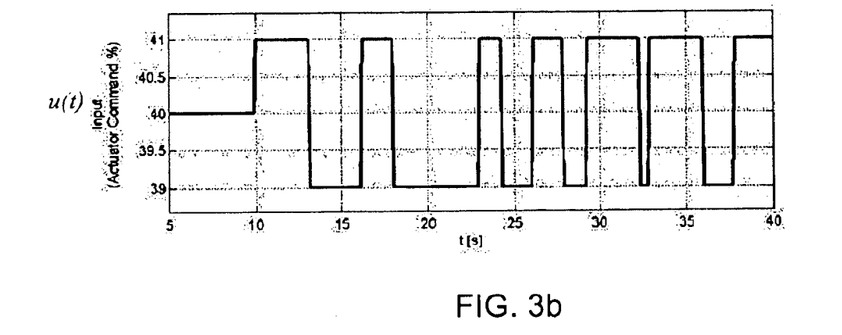

The turbocharger system, as explained above, is nonlinear, and therefore a sliding mode controller designed about a single linear model is ineffective. In system identification, a non-linear turbocharger system may be approximated by a linear transfer function for any given operating state. According to the invention, multiple linear transfer function models are obtained at different operating points. As stated, this model holds true for both VNT and waste-gate systems, both single input-single output (SISO) systems. For a second order model, the model can be expressed in the s-domain, $$\frac{Y(s)}{U(s)} = \frac{K}{s^2 + 2\xi\omega s + \omega^2}$$

Where the input U(s) is the s-domain (Laplace transform) pulse width modulated command signal provided to the VNT actuator or the waste gate actuator; Y(s) is the s-domain boost pressure; K is the static gain; co is the natural system pulsation, and $\xi$ is the damping coefficient. The system identification tests for a turbocharger system proceeds from this model, allowing the system identification data at various states, (e.g. gain, pulsation, and damping) to be determined. It is also known that the gain is typically a square of the pulsation, $K=G\omega^2$. For a selected system, system identification data is obtained from system models for various turbocharger systems by providing a pseudo random binary sequence (PRBS) input, which is represented by U(s) in the model. The actuator position, about which the PBRS will perturb the input is estimated at different speeds. In other words, the actuator position is a baseline and the PRBS perturbs the actuator position from steady state to obtain the system identification data. For the particular turbocharger system, the actuator position may be estimated though a closed loop controller to obtain the steady state position of the actuator at different speeds. Starting then from the steady state actuator positions with respect to a speed, the PRBS is introduced around this position with amplitude for variation (e.g. around 1%). In this case, care should be taken so that the duration of at least one step in the PRBS signal is greater than the time constant for the system response, e.g. at least two or three times the time constant. FIGS. 3a and 3b illustrate one example of introducing a PRBS input (actuator position) and the related output (boost pressure).

To identify system parameters (G and ω) according to the second order transfer function, the input-output data from the PRBS analysis is mean-centered. An unconstrained optimization routine can be performed to solve for each, G and A, at multiple operating states to minimize the square error between the output values obtained with the same input for the second order transfer function. The errors are evaluated at the same time instants where the outputs are measured. The optimization function can be represented as:

$$\min_{G,\omega} J = \sum_{i=1}^{N}\left[L^{-1}\left\{\frac{G\omega^2}{s^2+2\xi\omega s+\omega^2}U(s)\right\}\bigg|_{t=i\cdot\Delta T} - Y_{meas}(i)\right]^2$$

where U(s) is the Laplace transform of the PRBS signal introduced and $L^{-1}$ is the inverse Laplace transform. In this way it possible to directly obtain in the Laplace domain the value of the G and w that most accurately fit the given input output data.

Sliding Mode Control for Turbochargers

Figure 4A:
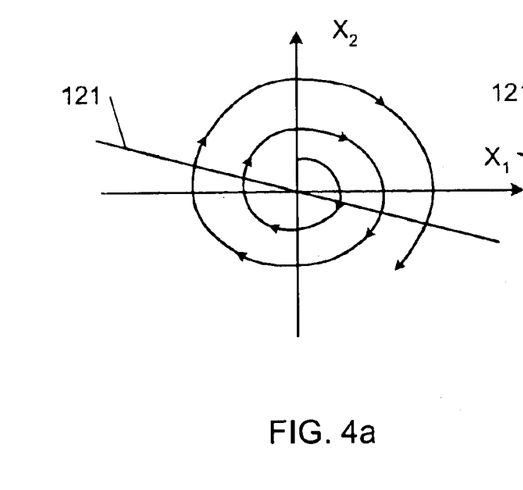
FIGS. 4(a)–(b) are phase plane diagrams of generic unstable systems and a control line according to one embodiment of the present invention.
Figure 4B:
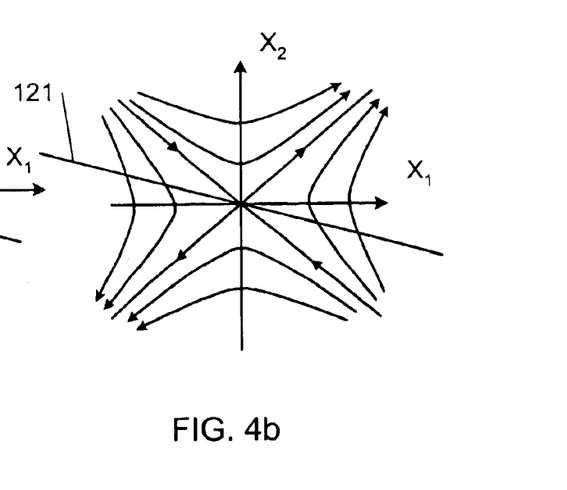
Figure 5:
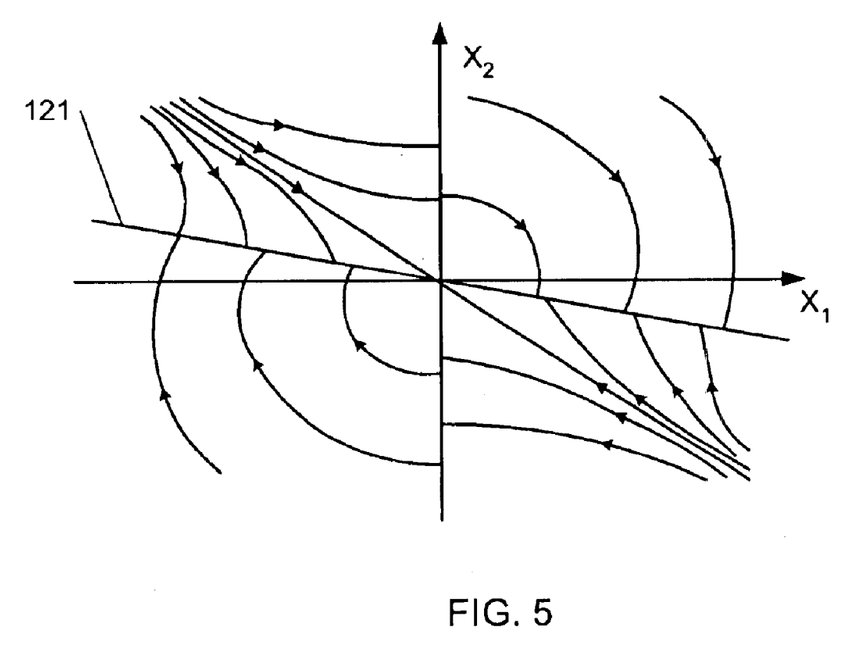
FIG. 5 is a phase plane diagram of a system defined by a control law for switching the system toward a control line according to one embodiment of the present invention.
Figure 6:
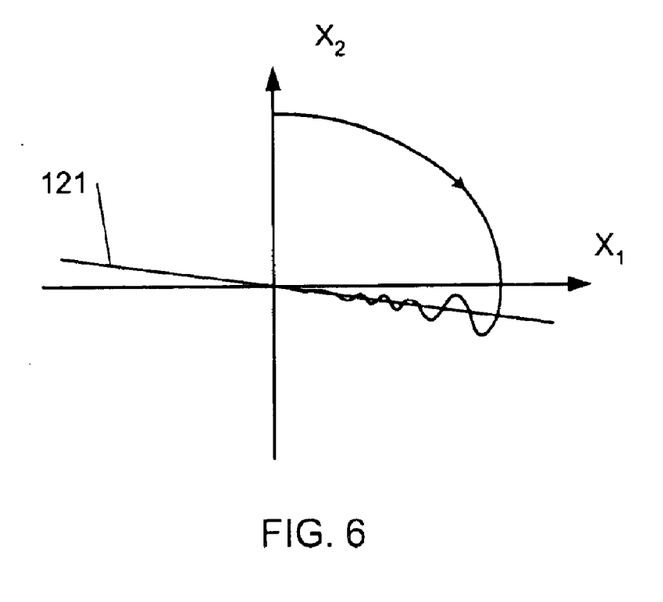
FIG. 6 is a phase plane diagram of a system defined by a control law for switching the system toward a control line and sliding the system to an origin according to one embodiment of the present invention.

Sliding mode control is a subset of a broader class of dynamic (feedback) systems known as variable structure systems. The sliding mode controller is best understood by looking at the phase plane diagram of a dynamic system instead of the more popular time response. For example, FIGS. 4a and 4b represent the phase plane plots of generic unstable non-linear systems ($X_1=x$; $X_2=dx/dt$). Stabilization can be achieved for unstable systems by defining a switching law about a line 121 through the plane. By defining a line 121 though the origin of the phase plane diagram the switching law is designed to draw the system, from any state, back to the switching line as in FIG. 5. By incorporating a switching law in a closed loop, the resulting system attracts any system from its original position to the switching line, and also by sliding the system along the line to the origin as shown in FIG. 6. Therefore a sliding mode controller defines stability toward the switching line through a closed loop, and the origin, which is a desired setpoint state is continuously is translated toward the set-point. The switching line is therefore defined by a plurality of steady state set-points for the non-linear system.

As stated earlier, the turbocharger system is modeled using a second order linear transfer function $$\frac{Y(s)}{U(s)} = \frac{K}{s^2 + 2\xi\omega s + \omega^2}$$

Where multiple sets of K and ω, each set at one of a plurality of states, are obtained from system identification tests as described above. From experimental analysis it was found that in most systems K varies from 1 to 10 and ω varies from 2 to 6. The model for multiple states is converted to state space and the states $X_1$ and $X_2$. Only one output is actually measured, that is y, the boost pressure, which is state variable $X_1$. The state variable $X_2=\dot{y}$ is determined by an observer/estimator, described below. The state space model is represented as $$\frac{dX_1}{dt} = X_2$$

$$\frac{dX_2}{dt} = f + bu$$

$Y=X_1$ $f=-1.8\omega X_2 - \omega^2 X_1$ $b=K$

The parameters f and b are uncertain system parameters and the controller must be robust for any f and b, nominal values are selected for each within a boundary of uncertainty. For the bounds on f, assume that $$\omega = \hat{\omega} \pm \delta\omega$$

where $\hat{\omega}$ is the nominal value and $\delta\omega$ is the perturbation. In one embodiment of a turbocharger system used to develop the sliding mode controller, it was determined that $\hat{\omega}=4$ and $\delta\omega$ can vary from 0 to 2, and other turbocharger systems may have similar bounds. The bounds on f can then be described in terms of these variables, where $\hat{f}$ is the nominal value and f is the actual value. The bound, F, is selected such that:

$$|f-\hat{f}|=F$$

and then from the above, $$\hat{f}=-1.8\hat{\omega}X_2-\omega^2 X_1$$

and substituting $\hat{f}$ $$F=(\delta\omega^+)^2 X_1+\{1.8X_2+2\hat{\omega}X_1\}(\delta\omega^+)$$

where $(\delta\omega^+)$ is the maximum value of $\delta\omega$.

The uncertainty in b may be characterized as a multiplicative uncertainty that acts as a gain on the input u. It is advantageous to take the nominal value of b as the geometric mean of the bounds, $$\hat{b}=\sqrt{K^+K^-}$$

and by defining $$\beta = \sqrt{\frac{K^+}{K^-}}$$

then the bounds can be written as $$\beta^{-1} \leq \frac{b}{\hat{b}} \leq \beta$$

In a sliding mode controller, the switching line is the sliding surface, s, and is defined as:

$$s \equiv \tilde{X}_2 + \lambda \tilde{X}_1$$

$$\tilde{X}_1 \equiv X_1 - X_{1d} = y - y_d$$

$$\tilde{X}_2 \equiv X_2 - X_{2d} = \dot{y} - \dot{y}_d$$

Where the phase plane slope is the rise time for the controller, $\lambda$, and is selected when tuning the controller to the desired response times. Controlling the origin of a second order system to the desired set point is equivalent to keeping the system at s=0. This equivalent solution is the same as stabilizing the system $$\frac{ds}{dt}=0$$

to the origin (s=0). This is one advantage to employing a sliding mode controller of the present invention in that it reduces an $n^{th}$ order regulator ($2^{nd}$ order in our case) to a first order stabilization analysis.

In a coordinate system defined by the states, s is a plane or, as in this embodiment, a straight line. The system starts at any initial point and moves toward the sliding surface. Once it reaches the sliding surface, the controller slides the system to the desired set point. The sliding must satisfy two characteristics of the control law: (1) the state trajectory must be in the direction of the sliding surface, and (2) once the system is on the sliding surface, it should stay on the surface. The system is kept on the sliding surface by equivalent control. Equivalent control exponentially stabilizes the system toward the desired setpoint along the surface. As stated above, this is equivalent to maintaining ds/dt=0. Which yields $$\dot{s} = \frac{ds}{dt} = 0 \Rightarrow \dot{\tilde{X}}_2 + \lambda \dot{\tilde{X}}_1 = 0 \Rightarrow$$

$$\dot{X}_2 - \dot{X}_{2d} + \lambda(\dot{X}_1 - \dot{X}_{1d}) = 0 \Rightarrow$$

$$\hat{f} + \hat{b}\hat{u} - \ddot{y}_d + \lambda(X_2 - \dot{y}_d) = 0 \Rightarrow$$

$$\hat{u} = (\hat{b})^{-1}\{\ddot{y}_d - \hat{f} - \lambda(X_2 - \dot{y}_d)\}$$

The system brings states toward the sliding surface from any point by choosing u, the input, such that it follows the following condition:

$$\frac{1}{2}\frac{d}{dt}(s^2) \leq -\eta|s|$$

where $\eta$ is a strictly positive constant that is chosen arbitrarily. Satisfying the above condition therefore provides that on any state trajectory the distance from the surface (given by $s^2$) always decreases with time (since $$\frac{ds^2}{dt}$$

is always negative). In this regard, satisfying the above condition creates a robust system in that the system trajectory is always in the direction of the sliding surface regardless of the initial starting point.

The robustness of the system is further demonstrated by looking at the effects of f and b, if they had not been nominal values. The sliding surface is the desired operating line for the desired value of the system state. Independent of the above condition, values of f and b that differ from their nominal values would cause a trajectory away from the sliding surface, as greater uncertainty is introduced. Therefore by defining the control law that satisfies the above condition, the controller will bring the system back to the sliding surface and therefore to the desired set point.

The control law that satisfies the above condition is $$u=(\hat{b})^{-1}[\hat{u}-K_c \text{sgn}(s)]$$

with, $$K_c \geq \beta[F+\eta]+(\beta-1)|\hat{u}|$$

Where Kc represents the controller gain and the last term in the control equation ($K_c\text{sgn}(s)$) makes sliding mode controller nonlinear. This function changes as the system crosses the sliding surface.

Although equivalent control directs the system along the sliding surface toward the setpoint, in practice the controller causes the system to cross the sliding surface several times due to natural delay, such as illustrated in FIG. 6. The delay leads to the phenomenon of chattering. To avoid chattering, a boundary layer is defined across the sliding surface to decrease the gain of the controller when the system is in this boundary layer. In this manner, the system is not immediately switched in the opposite trajectory as soon as the system crosses the surface, rather it is switched at the boundary layer. For boundary layer control replace u with, $$u = (\hat{b})^{-1}\left[\hat{u} - K_c \cdot sat\left(\frac{s}{\phi}\right)\right]$$

where φ represents the thickness of the boundary layer. The chattering is lessened by increasing the value of φ, however there is a trade-off between the chattering and steady state error. Therefore, φ can be chosen through a tuning process.

In satisfying the above control law, the controller design is complete. There are two primary tuning parameters φ and λ. The value of φ is the trade-off between chattering and steady state error and is chosen according to the desired responsiveness. The value of λ determines the responsiveness for a step change in the setpoint, so the lower the value of λ, the lower the rise time.

Observer Design

The sliding mode control law discussed above assumes that all the state variables are available for feedback. In case of the turbochargers, only the output, y, (boost pressure) is available for feedback. For sliding mode control, the unmeasured states are the derivatives of the output, which must be estimated for implementation of the controller. Simple numerical derivatives of the outputs from measurement transducers are not used because they cause amplification of measurement noise at high frequencies. Observers resolve this problem since they include filtering by the use of a system model.

Model Based Observers

Figure 7:
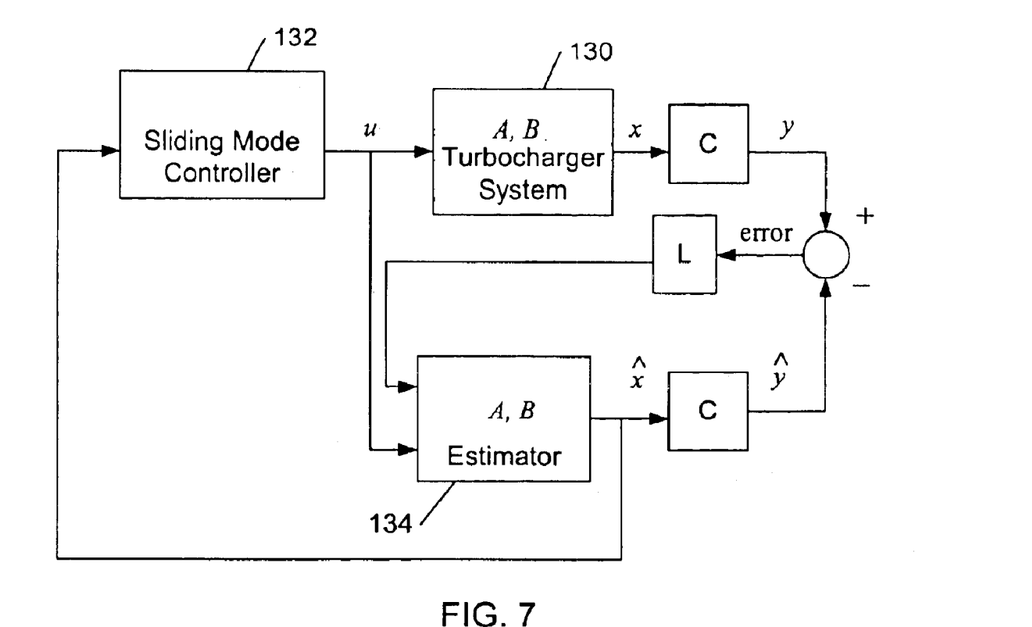
FIG. 7 is a block diagram of an observer for a sliding mode controller according to one embodiment of the present invention.

Referring now to FIG. 7, one method of estimating the state is to construct a full-order model of the plant dynamics. The actual turbo charger system 130 provides boost pressure out to the observer and the sliding mode controller 132 also provides actuator input to the observer. The observer comprises a state estimator 134, and feedback control.

If the $\hat{x}$ represents the estimated state, it can be written $$\tilde{x} = A\hat{x}Bu$$

Where A and B matrices are desired from the turbocharger system model and 'u' is the control input from the sliding mode controller 132. An estimator 134 for determining $\hat{x}$ is sufficient if the correct initial condition is obtained and values of A and B are known. Absent any feedback, this type of observer is open loop. Considering the open loop observer (not illustrated in FIG. 7), if the initial conditions are not known precisely, an open loop observer leads to a continually growing error in the estimated state. The error is demonstrated by the dynamics between the current state and the estimated state, assuming that the A matrix is exactly known:

$$\tilde{x} = A\tilde{x}$$

$$\tilde{x} = x - \hat{x}$$

The error converges to zero if A is stable, but the rate of convergence is not controlled. The error can be made to converge to zero at a faster rate by using feedback. Referring once again to FIG. 7, feedback is achieved by providing the difference between the actual output 'y' and estimated output 'ŷ' and correcting the observer model with this continuous error signal. The output 'y' is known from measurement, and the estimated output from the states C $\hat{x}$ are known. The equation for this feedback is then, $$\hat{x} = A\hat{x} + Bu + L(y - C\hat{x})$$

Here L is a proportional gain defined for each state as $L=[l_1 l_2 l_3 \ldots l_n]^T$ and it is chosen to control error convergence. The error dynamics in this case will be $$\tilde{x} = (A - LC)\tilde{x}$$

If L is chosen so that A−LC has Eigenvalues in the left half plane, the error decays to zero, and the error will remain at zero independent of the value of the input, u. The error is then also independent of the initial state $\hat{x}(0)$, and $\hat{x}$ will converge to x.

Note that in obtaining the above results A, B and C are assumed to be the same for both the physical plant and the estimator. Therefore, it is necessary to have an accurate model of the plant, or the error dynamics will not be governed by the above equation. The values of L can be chosen to reduce the effects of modeling error. The selection of L can be achieved in the same manner as selecting a controller gain K for pole placement controller using the Ackermamm's formula for example, thus minimizing the disturbances of small modeling errors.

Model Independent Observer

Figure 8:
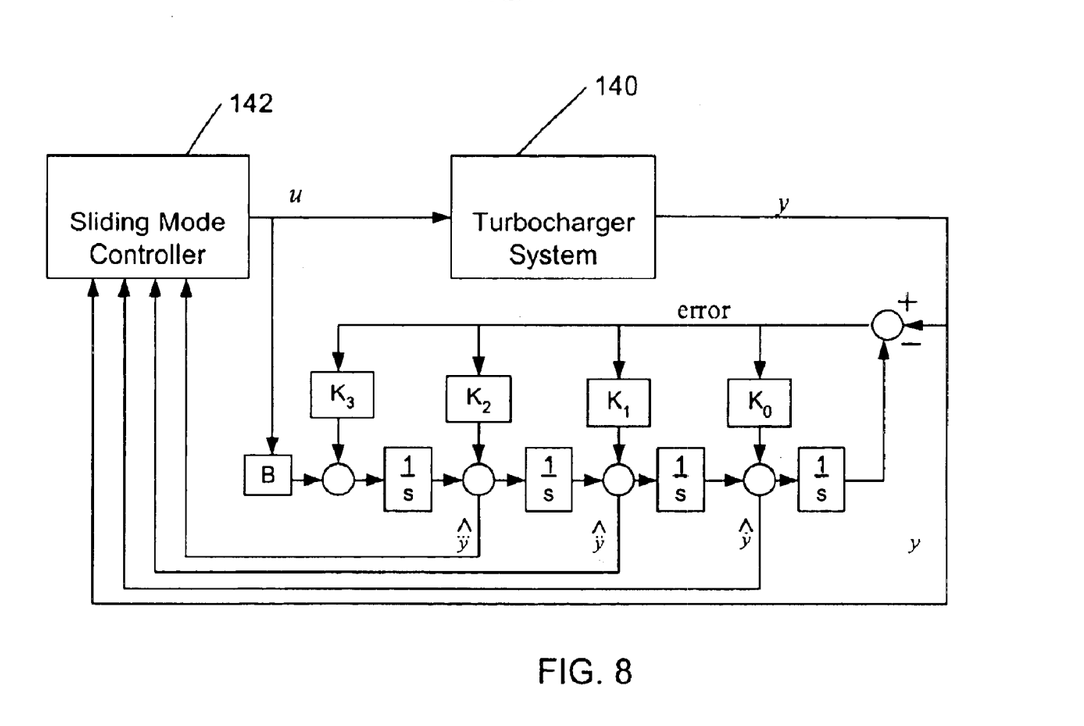
FIG. 8 is a block diagram of an alternative embodiment of an observer for a sliding mode controller according to one embodiment of the present invention.

Referring now to FIG. 8, an alternative observer is also provided that permits implementation independent of knowledge of the plant model. The actual turbocharger system 140 provides boost pressure out to the observer and the sliding mode controller 142 also provides actuator input to the observer. This observer structure is similar to a conventional observer for obtaining a set of derivative approximations, except that a chain of integrators replaces the turbocharger system estimation model. The chain of integrators determine output derivatives up to the third order. The chain of integrators is equal in number to the maximum order of derivative required, plus one. Therefore for three derivatives, four integrators are required.

Thus, if the output of the last integrator is y, then its input must be $\dot{y}$. If the output of the third integrator is $\dot{y}$, then its input must be $\ddot{y}$. If the output of the second integrator is $\ddot{y}$, then its input must be $\dddot{y}$. In one embodiment, the first integrator is chosen to be the third derivative $\dddot{y}$ to ensure that high frequency measurement noise is not amplified in the estimates of $\dddot{y}, \ddot{y}, \dot{y}$. The multiple integrator chain is implemented in an observer as illustrated in FIG. 8. In this case, the integrator functions in place of a real time plant model.

The input output transfer function of the observer diagram is $$\begin{bmatrix} \hat{y}(s) \\ \hat{\dot{y}}(s) \\ \hat{\ddot{y}}(s) \\ \hat{\dddot{y}}(s) \end{bmatrix} = \frac{\begin{bmatrix} B \\ B(s+K_0) \\ B(s^2+K_0 s+K_1) \\ B(s^3+K_0 s^2+K_1 s+K_2) \end{bmatrix} u(s) + \begin{bmatrix} K_0 s^3+K_1 s^2+K_2 s+K_3 \\ (K_1 s^2+K_2 s+K_3)s \\ (K_2 s+K_3)s^2 \\ K_3 s^3 \end{bmatrix} y(s)}{s^4+K_0 s^3+K_1 s^2+K_2 s+K_3}$$

The characteristic polynomial of the estimator is therefore $$s^4 + K_0 s^3 + K_1 s^2 + K_2 s + K_3$$

The poles of the correction loop are assigned to one place at $s=-(1/T_F)$, where $T_F$ is the filtering time constant. The desired characteristic polynomial is therefore $$[s+(1/T_F)]^4$$

Multiplying this through the equation and equating the estimator characteristic polynomial then yields:

$$s^4 + K_0 s^3 + K_1 s^2 + K_2 s + K_3 = s^4 + \frac{4}{T_F}s^3 + \frac{6}{T_F^2}s^2 + \frac{4}{T_F^3}s + \frac{1}{T_F^4}$$

This estimator performs best in the absence of measurement noise if $T_F?0$. Thus, in the time domain this is:

$$\lim_{T_F \to 0} \begin{bmatrix} \hat{y}(t) \\ \dot{\hat{y}}(t) \\ \ddot{\hat{y}}(t) \\ \dddot{\hat{y}}(t) \end{bmatrix} = \begin{bmatrix} y(t) \\ \dot{y}(t) \\ \ddot{y}(t) \\ \dddot{y}(t) \end{bmatrix}$$

It should be noted that the model input parameter, B, does not have any influence on the estimator performance in this limit. The input parameter, B, does have influence in practice due to the presence of measurement noise, however, with $T_F?0$, each of the derivative estimates are subject to low pass filter via the measurement input, y. In this manner, amplification of high frequency measurement noise is avoided and the effects of noise are minimized. The input parameter, B, also provides some compensation for the dynamic lag due to the filtering action on the measurement input. Accordingly, choosing $T_F$ and B in this observer model has a performance trade-off: As $T_F$ is increased from zero, filtering of measurement noise improves but at the expense of deterministic (transient) state estimation errors due to the imperfect plant model. If this model is used, then final implementation on the turbocharger system should include trials throughout the range of plant operation to validate and tune the settings for the two parameters, $T_F$ and B.

The sliding mode control system and, more particularly, the sliding mode controller and the observer generally comprise and operate under the control of computer software that is supported and executed by a processor or other computing device, if so desired. The computer software is designed such that its execution implements the control functionality of a non-linear turbocharger response by controlling the input, either VNT or waste-gate actuator, as described above.

In summary, a sliding mode control system and a sliding mode control system for a turbocharger are described hereinabove. The turbocharger is controlled by the disclosed sliding mode controller and observer by manipulating an actuator according to the disclosed control law, typically by means of pulse width modulation, or some other electrical control known to those of ordinary skill in the art. The control law follows positioning of the actuator by way of measuring the output, the boost pressure of an internal combustion engine, and therefore controlling the boost pressure. The actuator is typically either a VNT actuator or waste gate actuator that changes the work of exhaust gas transferred to a turbine, which drives a boost pressure compressor.

Also, a method for defining a sliding mode control system for a turbocharger system is disclosed. The method includes perturbing the actuator from a steady state and measuring the resulting boost pressure output. The perturbation and measurements are repeated for a plurality of states of operation of the turbocharger. As a result, system parameters can be identified for each of the plurality of states from the plurality of perturbations and measurements. The system parameters are represented in state space such that multiple linear models may be devised for different states represented by coefficients of a linear turbocharger system model. As such, the sliding mode control law may be defined for each of the plurality of states.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A sliding mode control system for controlling the boost pressure of a turbocharger system comprising:
   an actuator for controlling the boost pressure, the actuator position being configured to be electrically controlled;
   a sliding mode controller, the actuator being responsive to the sliding mode controller, the sliding mode controller satisfying a control law that stabilizes the turbocharger system toward a sliding surface, s, defined by a line on a phase plane diagram of boost pressure state, the control law being determined from a plurality of linear models, each model defined by one of a plurality of operating states of the turbocharger system.

2. The sliding mode control system according to claim 1, wherein the actuator is a electromechanical variable nozzle turbine system.

3. The sliding mode control system according to claim 1, wherein the actuator is a electromechanical waste gate valve.

4. The sliding mode control system according to claim 1, wherein the sliding mode controller further comprises satisfying the control law defined by ds/dt=0.

5. The sliding mode control system according to claim 4, wherein the sliding mode controller further comprises satisfying the control law defined by $ds^2/dt?-\eta|s|$, wherein $\eta$ is a positive constant.

6. The sliding mode control system according to claim 5, wherein the sliding surface, s, is defined between bounds, wherein the gain is decreased while the turbocharger system is operating between the bounds.

7. The sliding mode control system according to claim 1, further comprising an observer for estimating a derivative of the boost pressure state, and providing the estimated state to the sliding mode controller.

8. The sliding mode control system according to claim 7, wherein the observer comprises a state estimator based on a model of the turbocharger system.

9. The sliding mode control system according to claim 7, wherein the observer comprises a state estimator based on a series of integrators.

10. A method of defining a sliding mode control algorithm for a turbocharger system having an actuator for controlling boost pressure, comprising:
    perturbing the actuator from a steady state;
    measuring the boost pressure output from the perturbation;
    repeating the perturbing and measuring steps for a plurality of states of operation;
    identifying system parameters for each of the plurality of states from the plurality of perturbations and measurements, wherein the system parameters are coefficients of a linear turbocharger system model;
    defining a sliding mode control law for each of the plurality of states to stabilize the turbocharger system toward a sliding surface, s, defined by a line on a phase plane diagram of the boost pressure.

11. The method according to claim 10, wherein the step of perturbing comprises introducing a pseudo random binary sequence to the actuator.

12. The method according to claim 10, wherein the step of perturbing comprises perturbing for a time at least two times the time constant of the system response.

13. The method according to claim 10, wherein the step of identifying system parameters further comprises identifying coefficients of a linear turbocharger system model of at least a second order.

14. The method according to claim 10, wherein the step of identifying system parameters comprises solving for system parameters by an optimization equation.

15. The method according to claim 14, wherein the step of identifying system parameters by an optimization equation comprises minimizing the square error between the measured boost pressure and the boost pressure modeled as a function of the actuator perturbation.

16. The method according to claim 10, wherein the step of defining the sliding mode control law further comprises controlling $ds/dt=0$.

17. The method according to claim 16, wherein the step of defining the sliding mode control law further comprises controlling $ds^2/dt?-\eta|s|$, wherein $\eta$ is a positive constant.

18. The method according to claim 10, further comprising defining an observer for estimating a derivative of the output state.

19. The method according to claim 18, wherein the step of defining an observer comprises defining an observer including a state estimator based on a model of the turbocharger system.

20. The method according to claim 18, wherein the step of defining an observer comprises defining an observer including a state estimator based on a series of integrators.

* * * * *